(12) United States Patent  (10) Patent No.: US 8,435,113 B2
Willis et al.  (45) Date of Patent: May 7, 2013

(54) METHOD AND SYSTEM FOR DISPLAYING OF TRANSPARENT ADS

(75) Inventors: Daniel Willis, Stittsville (CA);
Dhananjay Godse, Kanata (CA);
Gordon Freedman, Nepean (CA)

(73) Assignee: Google Inc., Mountain View, CA (US)

( * ) Notice: Subject to any disclaimer, the term of this patent is extended or adjusted under 35 U.S.C. 154(b) by 570 days.

(21) Appl. No.: 11/300,376

(22) Filed: Dec. 15, 2005

(65) Prior Publication Data

US 2006/0130095 A1  Jun. 15, 2006

Related U.S. Application Data

(60) Provisional application No. 60/636,028, filed on Dec. 15, 2004.

(51) Int. Cl.
*A63F 13/00* (2006.01)
(52) U.S. Cl.
USPC .................................... 463/29; 705/14.4
(58) Field of Classification Search .................. 345/419; 705/14.4, 14.72; 463/29, 42
See application file for complete search history.

(56) References Cited

U.S. PATENT DOCUMENTS

| | | | |
|---|---|---|---|
| 5,724,424 A | 3/1998 | Gifford | |
| 5,742,289 A * | 4/1998 | Naylor et al. | 345/419 |
| 5,816,918 A | 10/1998 | Kelly et al. | |
| 5,941,772 A | 8/1999 | Paige | |
| 5,946,664 A | 8/1999 | Ebisawa | |
| 6,036,601 A | 3/2000 | Heckel | |
| 6,196,920 B1 | 3/2001 | Spaur et al. | |
| 6,285,985 B1 | 9/2001 | Horstmann | |
| 6,402,615 B1 * | 6/2002 | Takeuchi | 463/31 |
| 6,513,052 B1 | 1/2003 | Binder | |
| 6,928,414 B1 | 8/2005 | Kim | |
| 2002/0004743 A1 | 1/2002 | Kutaragi et al. | |
| 2002/0120589 A1 | 8/2002 | Aoki | |
| 2002/0156679 A1 * | 10/2002 | Castle | 705/14 |
| 2004/0015608 A1 | 1/2004 | Ellis et al. | |
| 2004/0148221 A1 * | 7/2004 | Chu | 705/14 |
| 2005/0246638 A1 | 11/2005 | Whitten | |

FOREIGN PATENT DOCUMENTS

EP 1 087 312 A2 3/2001

OTHER PUBLICATIONS

Project Gotham Racing 2. By: Linn, Demian. Electronic Gaming Monthly, Aug. 2003 Issue 169, p80.*
Project Gotham Racing 2 Screens for Xbox at Gamespot (http://www.gamespot.com/xbox/driving/projectgothamracing2/images.html?om_act=convert&om_clk=tabs&tag=tabs%3Bimages&page=6).*
GameSpot: Video Games. Search results for "Project Gotham Racing 2" (http://www.gamespot.com/search.html?type=11&stype=all&tag=search%3Bbutton&om_act=convert&om_clk=search&qs=project+gotham+racing+2&x=0&y=0).*

(Continued)

*Primary Examiner* — Sunit Pandya
*Assistant Examiner* — Allen Chan
(74) *Attorney, Agent, or Firm* — Fish & Richardson P.C.

(57) ABSTRACT

In order to enhance visual representation of an advertisement within a video game optical characteristics of the advertisement are specified. Specifically, downloaded data corresponding to an advertisement is used to provide an advertising image within a virtual environment of a video game. The advertising image is displayed having a portion that appears to be at least one of transmissive and reflective. In this way, advertisements are displayed in a fashion consistent with the appearance of a corresponding advertisement in the real world.

26 Claims, 5 Drawing Sheets

OTHER PUBLICATIONS

GameSpot: Video Games. Search results for "Project Gotham Racing 2" (http://www.gamespot.com/search.html?type=11&stype=all&tag=search%3Bbutton&om_act=convert&om_clk=search&qs=project+gotham+racing+2&x=0&y=0).*

Project Gotham Racing 2 Screens for Xbox at Gamespot (http://www.gamespot.com/xbox/driving/projectgothamracing2/images.html?om_act=convert&om_clk=tabs&tag=tabs%3Bimages&page=6).*

* cited by examiner

METHOD AND SYSTEM FOR DISPLAYING OF TRANSPARENT ADS

This application claims benefit from U.S. Provisional Patent Application No. 60/636,028 filed Dec. 15, 2004, the entire contents of which are incorporated herein by reference.

FIELD OF THE INVENTION

The instant invention relates generally to advertising in video games and more particularly to the display of advertisements within video games that are partially or completely transparent.

BACKGROUND

Video games are a popular form of entertainment. Today, video games and the video game industry are beginning to rival Hollywood in delivering entertainment to young and old alike.

Similar to Hollywood, the cost of generating the entertainment quality that people have grown accustomed to has escalated rapidly in recent years and therefore, it has become advantageous to seek alternative revenue streams for video games. One such alternative revenue stream is advertising revenue.

Typically, video game advertising involves presenting advertisements based upon either of two formats. The first format, Static Ads, are inserted within a game during design and do not change once the game is shipped. Thus for example, a storefront shown in a virtual environment of a video game clearly displays trademarks of an authentic storefront. Alternatively a virtual cellular phone that a gamer is able to interact with in the context of a video game features a design that mimics a design for a real cellular telephone. These non-changing, static, advertisements are used in combination with other game content to provide the virtual environment of the video game. Thus, throughout gameplay and throughout the life of the game, the advertising feature never changes. This is analogous to product placements within films.

A second type of advertisement within video games that is now achieving popularity is dynamic ad placement. In dynamic ad placement, the advertising location within the game is predetermined and an advertisement is received dynamically from a broadband network to be inserted within the advertising location within the game. In a typical application, a billboard within a video game is designated as an advertising location. Texture data is provided for mapping onto the billboard dynamically during the play of the game, and that texture is then mapped on the billboard as the billboard comes within the view of the gamer. Thus, the gamer sees the advertising content shown on the billboard within the virtual environment supported by the video game. Unfortunately, the billboard advertisement is one type of advertisement and provides only a peripheral or background impression to a player.

It would be advantageous to provide enhanced advertisements in video games.

SUMMARY OF THE INVENTION

The invention supports the providing of advertisements with an at least partially transparent portion during a video game session supported by a computing device in which data for providing the advertisement is provided from another computing device.

More specifically, the invention teaches a method comprising:
providing a first system having a video game in execution thereon;
providing first advertising data, the first advertising data provided from a system remote to the first system; and,
displaying within the video game an advertisement based on the first advertising data, a portion of the advertisement at least partially transparent such that images from a virtual scene within the video game and virtually behind the portion of the advertisement are at least partially visible virtually therethrough.

Additionally, the invention teaches a method comprising:
providing a first system having a video game in execution thereon;
providing first advertising data, the first advertising data provided from a system remote to the first system; and,
displaying within the video game an advertisement based on the first advertising data, a portion of the advertisement at least partially reflective such that the advertisement when displayed appears virtually reflective.

The invention also provides a storage medium comprising instructions for being executed by a computing device, the instructions comprising:
executing a video game session;
receiving first advertising data, the first advertising data provided from a system remote to the computing device; and,
displaying within the video game session an advertisement based on the first advertising data, a portion of the advertisement at least partially transparent such that images from a virtual scene within the video game session and virtually behind the portion of the advertisement are at least partially visible virtually therethrough.

In addition, the invention provides a storage medium comprising instructions for being executed by a computing device, the instructions comprising:
executing a video game;
receiving first advertising data, the first advertising data provided from a system remote to the computing device; and,
displaying within the video game an advertisement based on the first advertising data, a portion of the advertisement at least partially reflective such that the advertisement when displayed appears virtually reflective.

BRIEF DESCRIPTION OF THE DRAWINGS

The invention is now described with reference to the figures in which:

FIG. 5 is a flowchart according to a fifth embodiment of the invention in which an ad location is transparent; and, FIGS. 6a to 6d illustrate aspects of a sixth embodiment of the invention in which.

DETAILED DESCRIPTION OF THE INVENTION

In the placement of dynamic advertising within video games, heretofore, advertisements have been textures or other images applied to fixed opaque surfaces such as billboards. This simplifies advertisement placement, ad creation and ad sales, however it also detracts from ad value and the creativity that can be applied during advertisement design. Thus, it is an aspect of the present invention to provide advertisements that support a range of visual properties, in which the advertisements are dynamically delivered within a video game.

Figure 1:
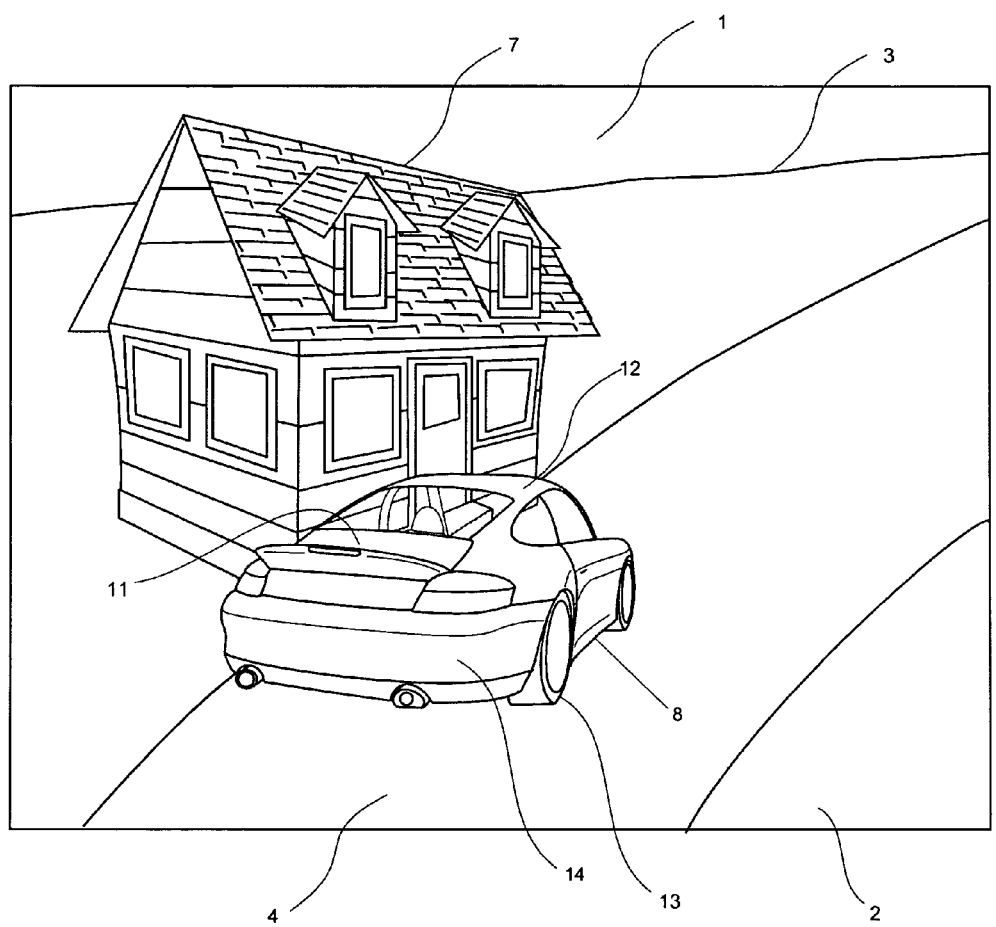
FIG. 1 is a diagram illustrative of the first embodiment of the invention in which a background is visible through a window portion of a downloaded advertisement in the form of a car.

Referring to FIG. 1, a simplified line diagram of a video game display screen according to a first embodiment of the invention is shown. Here, within the virtual environment of the video game, the sky 1 and the ground 2 meet at the horizon 3. A road 4 is displayed along the ground reaching out toward the horizon 3. In the background, a house 7 is shown partially occluded by car 8 driving along the road 4. The car 8 is displayed in accordance with advertising data provided via a network connection. As shown in FIG. 1, the visible surface of the car is a texture map presented with a trunk portion 11, a roof portion 12 and the wheel portions 13. Below the trunk portion is a bumper portion 14. The texture map is applied to an object shaped like the car in order to result in the automobile. The windows of the automobile are preferably similar in appearance to real windows. Thus, the windows are designated differently than opaque portions of the car, which are structurally defined, and then texture mapped. When the car 8 is provided in a manner such that a gamer while playing a video game sees the car 8 and recognizes an automotive brand the presence of the car 8 has provided an advertisement for the brand.

The car windows in this embodiment are described as transparent portions of the advertisement. The transparent portions are defined as having characteristics of a transparent medium. Thus, in the example of FIG. 1, objects on the other side of the car, such as the house 7, are visible through the rear window and front window of the car.

With current rendering technology as is commonly employed in video game consoles and personal computer systems, it is a straightforward matter to define the windows as having visual properties common to glass of a known thickness, and to have the rendering engine of the video game render the automobile with the transparent windows, such that the house on the other side of the rear window and the windshield appears to be viewed through panes of glass, in a fashion analogous to what one would see if one were looking a real object as seen through two panes of real glass. Optionally, showing reflections in the car windows based upon the geometry of the windows and their presence of other surfaces provides further, enhanced realism.

Clearly, the windows of the automobile are defined as other than merely textures being mapped onto the structure of the automobile. Further, by allowing for the definition of transparent portions of an advertisement, it now becomes possible to change the shape, angle, and size of the transparent portions in order to vary the car from one type of car to another, for example, from a hard top version of an automobile to a convertible version of the same automobile absent a requirement to download a new car advertisement.

The first embodiment of the invention is highly beneficial because it supports providing a wide range of downloadable game assets for use as advertisements having some degree of transparency. While the example of FIG. 1 is a car 8, a person of skill in the art will appreciate that other advertisements and product placements with transparent portions are also supported, such as: motorcycles with glass fairings, sunglasses, and certain goods provided in transparent packaging to name a few.

Figure 2:
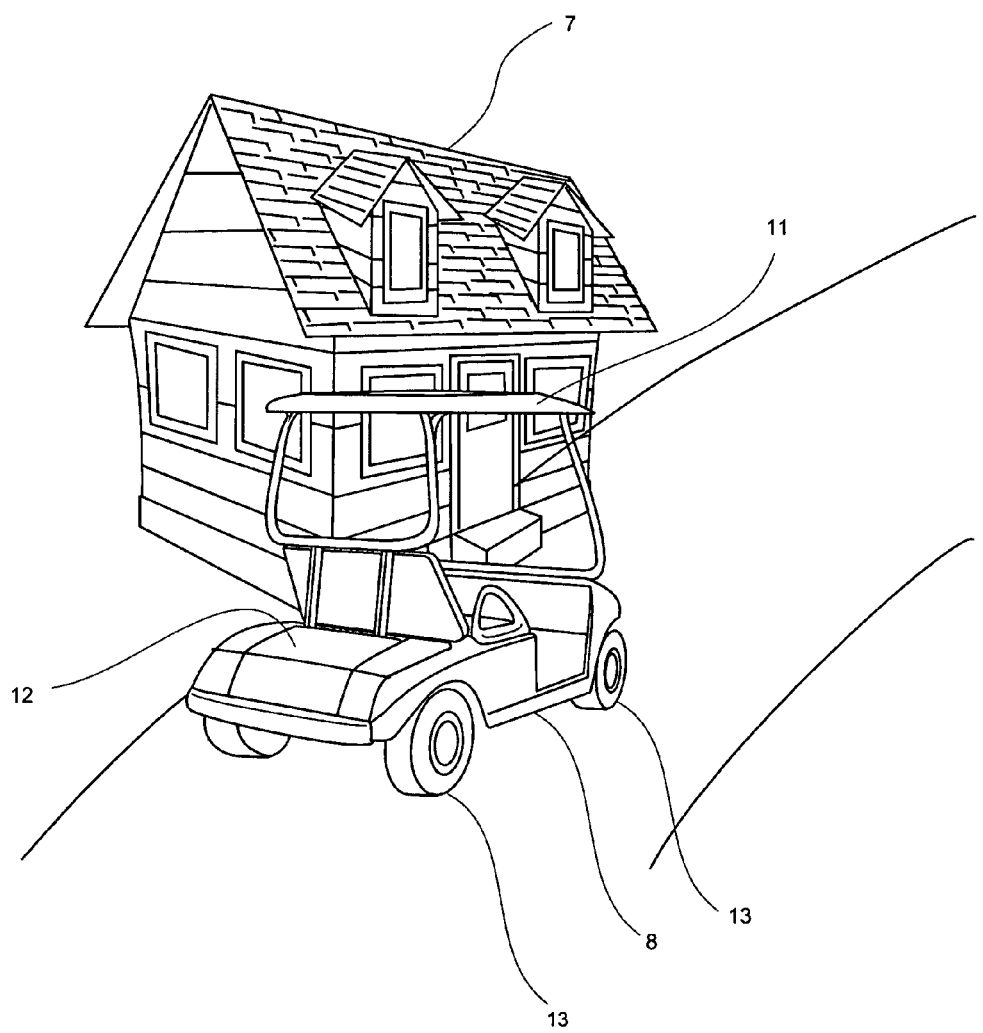
FIG. 2 is a diagram consistent with a second embodiment of the invention in which a background is visible through a transparent portion of an advertisement.

Referring to FIG. 2, a similar video game display to that of FIG. 1 is shown but here instead of an automobile, as shown in FIG. 1, a vehicle is shown having a roof portion 11, a trunk portion 12 and wheel portions 13 but absent any glass windows disposed therein. Such a vehicle is commonly used for moving people from one location to another, for example, in an amusement park. Here, as shown in FIG. 2, the transparent medium is air and is defined as such. Once again, the house 7 is visible through the transparent medium of the vehicle 8.

As is evident to those of skill in the art of advertising, it is extremely advantageous to provide for the flexibility of an advertisement with or without transparent portions and for those transparent portions to comprise a selectable medium through which items beyond the advertisement are visible.

Figure 3:
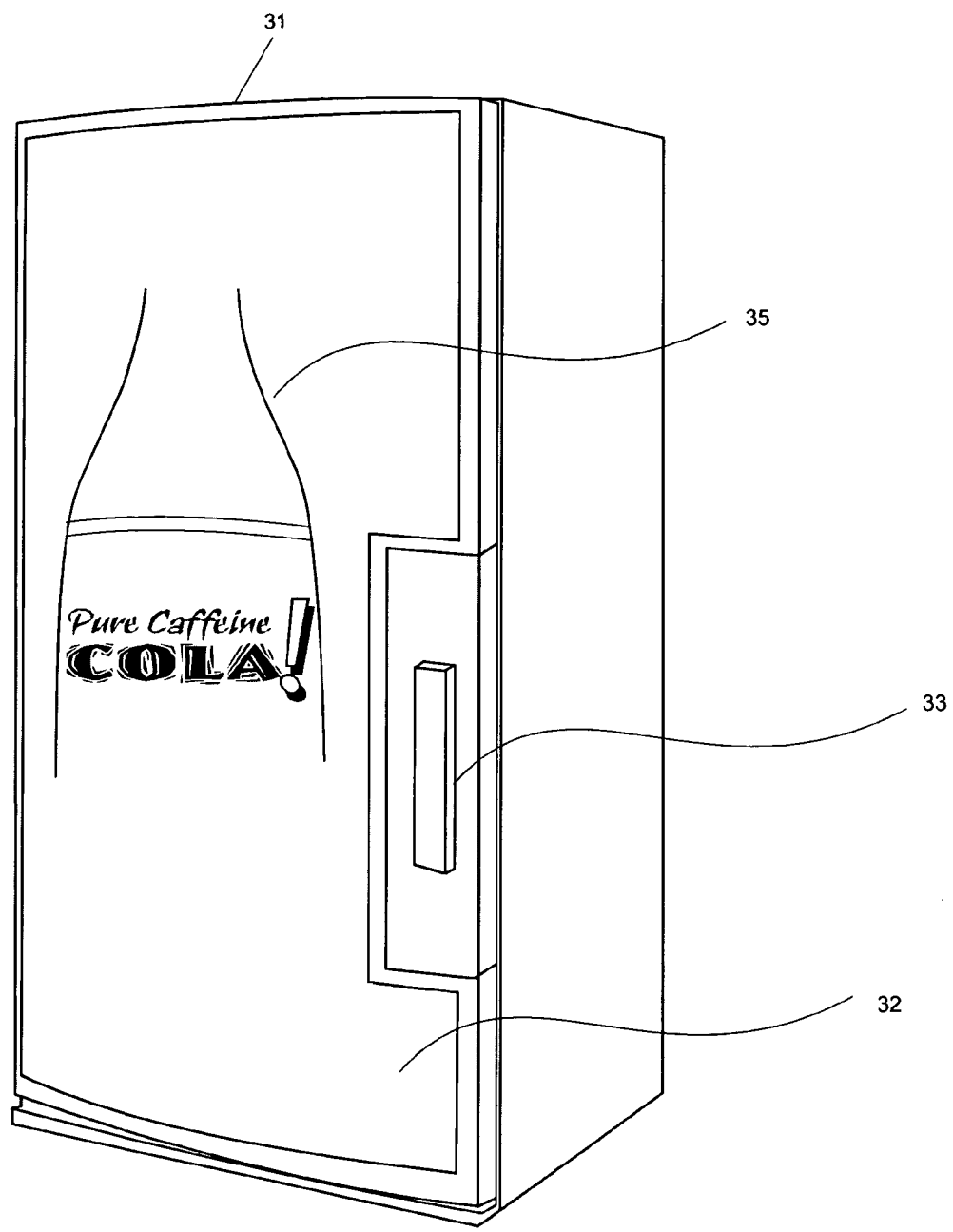
FIG. 3 is an illustration according to a third embodiment of the invention in which a door includes an advertisement and a transparent portion.

Referring to FIG. 3, another video display screen is shown. Here, a door 31 comprises window 32 and handle 33. The window 32 of the door 31 is shown having a logo 35 disposed thereon. For example, the logo 35 appears etched into the glass. Due to the optical properties of the glass, the logo disposed thereon is partially transparent and therefore affects the resulting rendered scene in a fashion that is distinct from a mere texture map upon the clear window. Further, the ability to see objects through the logo provides for enhanced realism, whether those objects are discernible or obfuscated through the logo. It will be apparent that changes in the surface of transparent glass are visible absent any changes in colour of the glass. That said, by providing both a change in colour of the glass in addition to a change in the geometry of the glass a viewer's attention is sometimes better drawn to the advertisement thereby enhancing the value of the advertisement.

Of course, by providing within an advertisement an indication of a medium therein, the etched logo is easily modified to become a reflective logo, a transparent logo within a smoked glass background, a cutaway logo, and so forth.

Figure 4:
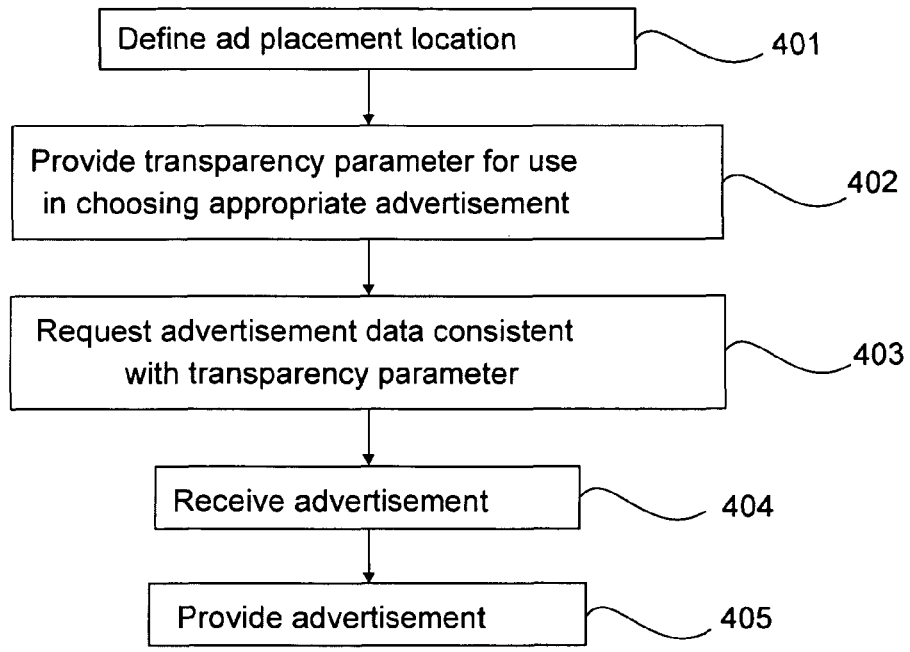
FIG. 4 is a flowchart according to a fourth embodiment of the invention in which an advertisement is requested in dependence upon a transparency parameter.

Referring to FIG. 4, a simplified flow diagram of a method according to the invention is shown. Here, an ad placement location is defined 401. As part of the ad placement location, an indicator indicates whether the placement location supports transparent advertisements 402. For example, a billboard likely only supports non-transparent advertisements, as it is a fixed board structure. Similarly, the side of a brick building optionally does not support transparent advertisements. In contrast, something hanging on the side of the building or a dynamic object or a billboard frame is optionally chosen for supporting transparent and opaque objects. As such, there is a tremendous amount of flexibility in the definition. The advertisement location, once defined to support transparent advertisements, is also defined in accordance with its size and shape where applicable. When the video game is executed, the video game requests an advertisement from an advertisement server for the advertising location 403, which is defined for supporting transparent and opaque advertisements. The advertisement is provided from the server to the game 404 along with a definition of transparent portions and the transparent medium for being disposed within the transparent portions of the advertisement. The advertisement is provided as an image on a video display 405. For example, a sign in a billboard is defined, instead of a solid texture, as series of objects spelling out a word with the medium of air disposed therebetween. The letters of the word each appears as if it is floating. Should more realism be desired, then the letter is optionally defined having some connection there between for mounting them to the sign. Alternatively, the words are defined as stenciled onto a back plane of transparent material, for example glass or plexiglass, providing the enhanced realism that they are supported and providing the visual effect of seeing through the glass of the sign. In this way a single advertising location supports a plurality of objects having air there between or a single object having transparent portions thereof disposed within the advertising spot.

Once the dynamic advertisement data is provided to the gaming system, the gaming system renders the advertisement with the transparent portions having the defined transparent medium therein for providing realistic game imaging with a broad range of impressions therein. Similarly, while video games show image data consistent with light in the visual spectrum, in some cases, visual signals are provided based upon data outside the visual spectrum. Thus, an avatar in a video game has an infrared scanning system that allows the gamer to visually discern a temperature property of assets within a game. Provided that assets within the game environment support such a temperature property, the temperature property is optionally used to enhance the contrast of, for example, a sign that is hotter than the surrounding environment when viewed with the infrared scope. Thus, a sign with a hot source of light, such as incandescent light bulbs becomes more prominent relative to its environment when viewed this way.

A person of skill in the art will appreciate that many video game engines incorporate sophisticated graphics rendering capabilities. Thus, while embodiments of the invention describe relative transparency of an advertisement other visual properties are optionally supported. For example, some surfaces are reflective. Other surfaces are glossy and therefore, highly reflective. Though highly reflective, such surfaces still have a colour that is apparent. Additionally, some surfaces act as discrete light sources. A person of skill in the art will appreciate that providing visual contrast between an environment and an object will often serve to draw the attention of the user to the contrast. This, in combination with a correct use of colour will serve to enhance an impression made by an advertisement and thereby enhance the value of the advertisement. Optionally, changing an optically aparent property such as transparency, reflectiveness, and luminance of a virtual surface in a predetermined fashion is used to provide an advertisement.

Figure 5:
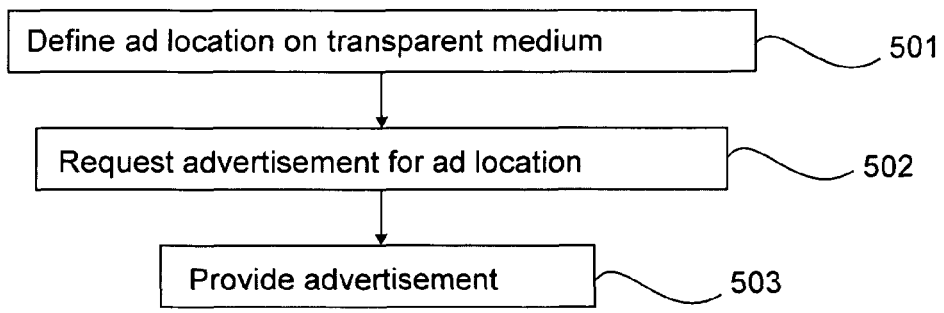

Referring to FIG. 5, a simplified flow diagram is shown for a method of providing an ad for displaying in a transparent fashion on a transparent medium. Here, an ad location is defined on a transparent medium 501. The location of the ad is defined to support both transparent and non-transparent advertisements. The advertising location is also defined to accept a texture to be mapped onto the medium and to include information about the transparent medium onto which the textures is mapped. When the game is executed, the game software queries from a server in communication with a network for advertisement data to display in the advertising location 502. The advertisement is optionally an opaque advertisement to appear texture mapped onto the transparent medium, a partially transparent ad to be displayed on the transparent medium in a partially transparent fashion and an advertisement for integration within the transparent medium either by overlaying a small amount of transparent medium having the advertisement therein or by providing an ad for modifying the existing transparent medium. Upon receiving the advertisement and upon the transparent medium coming into view within a field of view of a player of the video game, the advertisement is displayed applied to the transparent medium in accordance with the definition of the advertising location and the advertisement itself to provide for at least partially transparent advertisements 503.

A video game typically supports providing information relating to the virtual environment of a video game and presenting it in a fashion consistent with a real environment as viewed using a normal range of human senses. Thus, advertisements are provided as video signals in a context analogous to how they would be viewed in the real world. That said, video games provide the opportunity to allow a gamer to experience environments that support sensor information that is inconsistent with conventional senses. Thus, in certain circumstances a parameter defining a transparency of a medium is provided for supporting other visible characteristics, for example temperature when infrared vision is available to characters within a virtual environment of the video game.

Figure 6A:
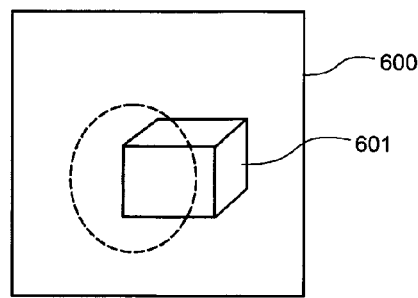
FIG. 6a shows an object as viewed through a transparent medium.
Figure 6B:
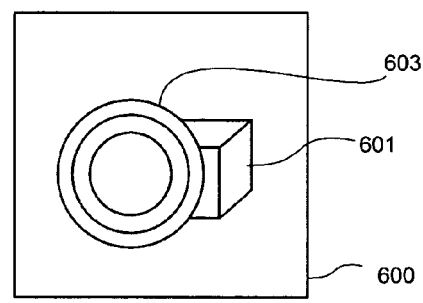
FIG. 6b shows the object partially covered by an opaque advertisement.
Figure 6C:
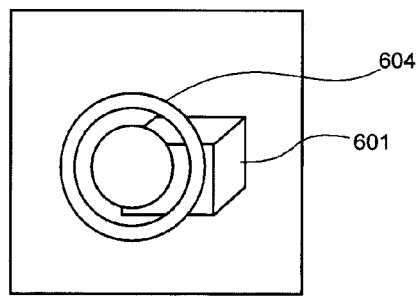
FIG. 6c shows the object disposed behind an advertisement with opaque portions and a transparent portion.
Figure 6D:
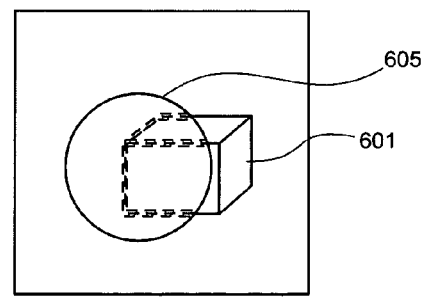
FIG. 6d shows the object disposed behind a transparent object that causes objects viewed through it to appear blurry.

Referring to FIG. 6a to 6d shown are simplified line diagrams of a transparent medium onto which advertisements are optionally placed. FIG. 6a illustrates the transparent medium 600 absent an advertisement with opaque object 601 disposed behind the transparent medium. FIG. 6b shows the transparent medium 600 of FIG. 6a having an opaque advertisement 603 mapped thereon in front of opaque object 601. In FIG. 6c the medium 600 is shown having an advertisement 604 mapped thereon with opaque object 601 disposed behind advertisement 604. The advertisement 604 has portions that are opaque and portions that are transparent. In FIG. 6d the advertisement 605 is transparent however it causes a blurring effect of surfaces viewed through it. Thus, the opaque object 601 disposed behind advertisement 605 appears somewhat blurry.

Clearly, there are a wide variety of methods of making an image used for an advertisement transparent. For example, when an advertisement is provided to a computing device it is optionally provided as image data without any indicators regarding characteristics associated with transmissivity or reflectivity. As such it would be normal practice to provide the advertisement in a fashion corresponding to an opaque surface. Clearly, if the advertisement is to be provided on a virtual billboard sign then assuming that the advertisement is opaque is appropriate. However, in some other contexts this is not necessarily the case. For example, when the advertisement is provided as an image on a clear drinking glass it is often desirable to have some portions of the advertisement being transparent. Thus, when an advertising spot is produced it is optionally configured to treat a predetermined color as corresponding to a transparent surface. As many games support 16 bit color resolution and with 32 bit color resolution becoming increasingly common there is very little loss in designating one color as being transparent. Alternatively, a predetermined range of colors or a predetermined set of colors is treated as being transparent. Specifically, if an advertisement is provided in a bitmap or JPEG format, each pixel of the rectangular shape of the file has a color attribute. Thus, if it is desired to provide hollow circle on a transparent surface, using an advertisement data file in a JPEG format will result in providing an opaque rectangle with hollow circle in which the center of the circle has the same color as a corner of the rectangle. That said, it is a simple matter to treat, for example, the color cyan as transparent and therefore advertisements provided with cyan backgrounds are shown without their background but all image data corresponding to other colors are presented normally.

A person of skill in the art will also appreciate that, in accordance with the invention, advertisements are optionally integrated in an advertising spot in a video game in a variety of ways. Specifically, an advertisement optionally does not specify transparency and reflectivity parameters and the surface that the advertisement is applied to is an asset within a video game, the asset within the video game having predetermined optical characteristics. When the advertisement is applied to the advertising spot, a transparency parameter and a reflectivity parameter are optionally assigned. The assignment of these parameters is made in accordance with advertising criteria. These criteria are provided to ensure that the resulting advertisement is visible. Thus, for example, if a transparent advertisement is applied to a transparent surface it is apparent that the resulting advertisement will be entirely transparent and, absent other visual effects associated with the advertisement, the resulting advertisement is difficult to see. By assigning a change in transparency and reflectivity to the advertising data, the resulting advertisement is given a higher contrast. Similarly, when an advertisement that has a very high reflectivity is applied to highly reflective surface, the resulting advertisement is difficult to see. Thus, the video game software that provides the advertising spot optionally rejects the reflective advertising data for advertising spot disposed on a reflective surface. Alternatively, the video game software changes at least one of the reflectivity and the transparency of the advertisement such that the resulting advertisement is clearly visible. Further still, an opaque advertisement is optionally modified for increased transparency. Optionally, any changes to a transparency parameter and reflectivity parameter are carried out according to a predetermined set of rules. Further optionally, the predetermined set of rules comprises an algorithm, and the output of the algorithm is dependent upon external advertisement data provided thereto. In addition, an advertisement data file comprising image data is optionally provided with a desirable transparency parameter range and a desirable reflectivity range that are suitable as inputs for the algorithm. Further still, such an advertisement data file further comprises advertisement identity data for providing a related advertisement having at least one of a transparency parameter range and reflectivity parameter range substantially different from the transparency parameter range and the reflectivity parameter range of the advertisement data file. Optionally, at least one of the transparency parameter range and the reflectivity parameter range of the related advertisement are specified in the advertisement data file.

A person of skill in the art will appreciate that "transparent", "reflective" and "opaque" are used as general descriptions but could also be interpreted to represent physical absolutes. Thus, while it is considered that glass used in window panes is transparent it is well known that a window pane made sufficiently thick would absorb far more visible light than it would transmit causing it to appear opaque. Thus, a person of skill in the art will appreciate that different objects absorb, transmit and reflect light in different ways. These amounts are helpful in identifying objects based upon their appearance. For example, in the real world a wood grain finish is associated with wood and a shiny surface is associated with unpainted metal. This knowledge is often used by video game designers to provide virtual environments that closely resemble real environments. Further, surface treatments often result in different light transmission characteristics, for example, if a surface of a windowpane made of transparent glass is scraped then a portion of that surface may become opaque. A metal surface that has been machined looks significantly different from a metal surface that is polished.

Thus, the appearance of a surface is optionally used to convey information. In a video game surfaces and objects are provided characteristics that are used to convey information to the gamer when those surfaces are rendered during a gaming session. A person of skill in the art will appreciate that an advertisement is optionally provided in a virtual environment merely by selectively providing a pattern to a surface in which the pattern is associated with a specific brand. Thus, in a video game, an advertisement is optionally provided by merely causing a portion of a transparent surface to become more transparent than its surroundings such that it displays an image of a recognizable brand.

In addition, real world physical surface conditions are optionally mimicked in video games by superimposing image data over the surface. For example, in a video game, a virtual fender of a virtual new car is likely to be shown having a relatively high reflectivity value thereby giving the fender the appearance of a new glossy fender. If the virtual fender is then hit by another virtual car in a video game session then the fender surface is optionally modified to indicate this interaction. Specifically, the surface of the fender is deformed and an image is superimposed on the fender to provide the appearance of damaged fender. In a region where the virtual fender has been scraped, the appearance of the damaged fender is altered to have less reflectivity and, optionally, a change in color. Similarly, in areas where the surface of the fender that been deformed, the reflectivity of the fender is changed to provide an image that is consistent with realistic damage. Further still, in some cases, to enhance realism, the color of the fender is changed to mimic new shadows. In the event that an advertisement is disposed on the fender, then the advertisement data is optionally modified in a corresponding fashion. In this way, a wide variety of different surface finishes are optionally supported. Further still, a virtual surface supporting an advertisement spot is optionally modified to display an advertisement on a surface in dependence upon a smoothness flag. The smoothness flag is used to modify the surface to provide an image corresponding to either of a smooth surface and a rough surface. Alternatively, a smoothness parameter is provided instead of a smoothness flag. The smoothness parameter is then used to mimic a surface having a relative smoothness such that, for example, a high value of smoothness parameter is used to mimic a smooth surface, a low value is used to mimic a rough surface and other values are used to mimic surfaces having smoothness characteristics between smooth and rough.

A person of skill in the art will appreciate that providing advertisements in video game allow a wide variety of visual effects to be used to advertise products. In many cases such visual effects are consistent with real world visual effects that, while possible, may be impractical to carry out based upon current technology. For example, an advertisement in a video game is optionally provided in a transparent window by providing an image consistent with selectively disposed virtual bubbles within a virtual glass pane. Such an effect is optionally carried out in variety of fashions. For example, a video game rendering engine optionally renders a virtual glass pane with virtual bubbles to provide a suitable image. While this technique is likely to produce a visually appealing result, the rendering of the result is likely to be slow and a gamer playing the video game is likely to experience a reduction in gameplay quality. Alternatively, the virtual bubbles are provided as an image superimposed on the glass. In this case it is suggested that the virtual bubbles be provided by spcifying optical transmission and reflection characteristics to selected portions of an image.

A person of skill in the art will appreciate that the embodiments of the invention provided hereinabove are intended to illustrative of the invention and not limiting. Such a person will also appreciate that numerous other embodiments of the invention are supported without departing from the spirit and the scope of the invention.

What is claimed is:

1. A computer-implemented method, comprising:
presenting a virtual game environment on a display of a gaming device, the virtual game environment comprising an advertisement placement location on a virtual medium, the advertisement placement location having a definition specifying an optical property of the virtual medium selected from a group comprising transparency, reflectivity, and smoothness of a material imitated by the virtual medium;
sending the definition specifying the optical property of the virtual medium to an advertisement server;
receiving an advertisement data file from the advertisement server, the advertisement data file comprising an advertisement image and one or more advertising criteria specifying a corresponding optical property of the advertisement image according to the specified optical property of the virtual medium; and
applying the advertisement image for presentation at the advertisement placement location during game execution in accordance with the one or more advertising criteria such that at least a portion of the virtual game environment is displayed at a location associated with the virtual medium based on the advertisement image and the one or more advertising criteria.

2. The method of claim 1, where the specified optical property of the virtual medium is transparency.

3. The method of claim 2, where the advertisement image has two or more portions, and where the one or more advertising criteria specify a corresponding transparency parameter for at least one of the two or more portions of the advertisement image.

4. The method of claim 3, where the corresponding transparency parameter of a first portion of the two or more portions of the advertisement image creates a visual contrast between the virtual medium and the first portion of the advertisement image.

5. The method of claim 2, where
the advertisement image has one or more portions;
the one or more advertising criteria specify a transparency range for at least one of the one or more portions of the advertisement image;
the one or more advertising criteria further specify one or more rules to facilitate visibility of the advertisement image at the advertisement placement location; and where
applying the advertisement image for presentation at the advertisement placement location during game execution in accordance with the one or more advertising criteria further comprises:
assigning a transparency parameter to at least one of the one or more portions of the advertisement image in accordance with the transparency parameter range and the one or more rules to facilitate visibility.

6. The method of claim 2, where
the advertisement image has one or more portions;
the one or more advertising criteria specify a transparency range for at least one of the one or more portions of the advertisement image;
the one or more advertising criteria further specify one or more rules to facilitate visibility of the advertisement image at the advertisement placement location; and where
the advertising data file further comprises advertisement identity data for providing a related advertisement image having a transparency parameter range substantially different from the transparency range of the at least one of the one or more portions of the advertisement image, and where applying the advertisement image for presentation at the advertisement placement location during game execution in accordance with the one or more advertising criteria comprises:
assigning a transparency parameter to the related advertisement image in accordance with the transparency parameter range and the one or more rules to facilitate visibility; and
applying the related advertisement image in place of the advertisement image at the advertisement placement location during game execution.

7. The method of claim 1, where the specified optical property of the virtual medium is reflectivity.

8. The method of claim 7, where the advertisement image has two or more portions, and where the one or more advertising criteria specify a corresponding reflectivity parameter for at least one of the two or more portions of the advertisement image.

9. The method of claim 8, where the corresponding reflectivity parameter of a first portion of the two or more portions of the advertisement image creates a visual contrast between the medium supporting the advertisement placement location and the first portion of the advertisement image.

10. The method of claim 7, where
the advertisement image has one or more portions;
the one or more advertising criteria specify a reflectivity range for at least one of the one or more portions of the advertisement image;
the one or more advertising criteria further specify one or more rules to facilitate visibility of the advertisement image at the advertisement placement location; and where
applying the advertisement image for presentation at the advertisement placement location during game execution in accordance with the one or more advertising criteria further comprises:
assigning a reflectivity parameter to at least one of the one or more portions of the advertisement image in accordance with the reflectivity parameter range and the one or more rules to facilitate visibility.

11. The method of claim 7, where
the advertisement image has one or more portions;
the one or more advertising criteria specify a reflectivity range for at least one of the one or more portions of the advertisement image;
the one or more advertising criteria further specify one or more rules to facilitate visibility of the advertisement image at the advertisement placement location; and where
the advertising data file further comprises advertisement identity data for providing a related advertisement image having a reflectivity parameter range substantially different from the reflectivity range of the at least one of the one or more portions of the advertisement image, and where applying the advertisement image for presentation at the advertisement placement location during game execution in accordance with the one or more advertising criteria comprises:
  assigning a reflectivity parameter to the related advertisement image in accordance with the reflectivity parameter range and the one or more rules to facilitate visibility; and
  applying the related advertisement image in place of the advertisement image at the advertisement placement location during game execution.

12. A computer-implemented method, comprising:
  receiving from a gaming device a definition of an advertisement placement location on a virtual medium in a virtual game environment, the definition specifying an optical property of the virtual medium selected from a group comprising transparency, reflectivity, and smoothness of a material imitated by the virtual medium; and
  in response to the receiving, providing an advertisement data file to the gaming device, the advertisement data file comprising an advertisement image and one or more advertising criteria specifying a corresponding optical property of the advertisement image according to the specified optical property of the virtual medium, the one or more advertising criteria controlling presentation of the advertisement image at the advertisement placement location during game execution such that at least a portion of the virtual game environment is displayed at a location associated with the virtual medium based on the advertisement image and the one or more advertising criteria.

13. The method of claim 12, where the specified optical property of the virtual medium is transparency.

14. The method of claim 12, where the advertisement image has two or more portions, and where the one or more advertising criteria specify a corresponding transparency parameter for at least one of the two or more portions of the advertisement image.

15. The method of claim 14, where the corresponding transparency parameter of a first portion of the two or more portions of the advertisement image creates a visual contrast between the virtual medium supporting the advertisement placement location and the first portion of the advertisement image.

16. A non-transitory computer-readable medium having stored thereon instructions, which, when executed by a processor, cause the processor to perform operations comprising:
  sending a definition of an advertisement placement location on a virtual medium in a virtual game environment to an advertisement server, the definition specifying an optical property of the virtual medium selected from a group comprising transparency, reflectivity, and smoothness of a material imitated by the virtual medium;
  receiving an advertisement data file from the advertisement server, the advertisement data file comprising an advertisement image and one or more advertising criteria specifying a corresponding optical property of the advertisement image according to the specified optical property of the virtual medium; and
  applying the advertisement image for presentation at the advertisement placement location during game execution in accordance with the one or more advertising criteria such that at least a portion of the virtual game environment is displayed at a location associated with the virtual medium based on the advertisement image and the one or more advertising criteria.

17. The computer-readable medium of claim 16, where the specified optical property of the virtual medium is transparency, the advertisement image has one or more portions, and the one or more advertising criteria specify a corresponding transparency parameter for at least one of the one or more portions of the advertisement image.

18. The computer-readable medium of claim 17, where the advertisement image has two or more portions and the corresponding transparency parameter of a first portion of the two or more portions of the advertisement image creates a visual contrast between the virtual medium and the first portion of the advertisement image.

19. The computer-readable medium of claim 17, where
  the advertisement image has one or more portions;
  the one or more advertising criteria specify a transparency range for at least one of the one or more portions of the advertisement image;
  the one or more advertising criteria further specify one or more rules to facilitate visibility of the advertisement image at the advertisement placement location; and where
  the operation for applying the advertisement image for presentation at the advertisement placement location during game execution in accordance with the one or more advertising criteria further comprises operations for:
    assigning a transparency parameter to at least one of the one or more portions of the advertisement image in accordance with the transparency parameter range and the one or more rules to facilitate visibility.

20. The computer-readable medium of claim 17, where
  the advertisement image has one or more portions;
  the one or more advertising criteria specify a transparency range for at least one of the one or more portions of the advertisement image;
  the one or more advertising criteria further specify one or more rules to facilitate visibility of the advertisement image at the advertisement placement location; and where
  the advertising data file further comprises advertisement identity data for providing a related advertisement image having a transparency parameter range substantially different from the transparency range of the at least one of the one or more portions of the advertisement image, and where
  the operation for applying the advertisement image for presentation at the advertisement placement location during game execution in accordance with the one or more advertising criteria comprises operations for:
    assigning a transparency parameter to the related advertisement image in accordance with the transparency parameter range and the one or more rules to facilitate visibility; and
    applying the related advertisement image in place of the advertisement image at the advertisement placement location during game execution.

21. A non-transitory computer-readable medium having stored thereon instructions, which, when executed by a processor, cause the processor to perform operations comprising:
  receiving from a gaming device a definition of an advertisement placement location on a virtual medium in a virtual game environment, the definition specifying an optical property of the virtual medium selected from a group comprising transparency, reflectivity, and smoothness of a material imitated by the virtual medium; and sending an advertisement data file to the gaming device, the advertisement data file comprising an advertisement image and one or more advertising criteria specifying a corresponding optical property of the advertisement image according to the specified optical property of the virtual medium, the one or more advertising criteria controlling presentation of the advertisement image at the advertisement placement location during game execution such that at least a portion of the virtual game environment is displayed at a location associated with the virtual medium based on the advertisement image and the one or more advertising criteria.

22. The computer-readable medium of claim 21, where the specified optical property of the virtual medium is transparency.

23. The computer-readable medium of claim 22, where the advertisement image has two or more portions, and where the one or more advertising criteria specify a corresponding transparency parameter for at least one of the two or more portions of the advertisement image.

24. The computer-readable medium of claim 23, where the corresponding transparency parameter of a first portion of the two or more portions of the advertisement image creates a visual contrast between the virtual medium and the first portion of the advertisement image.

25. A system, comprising:
one or more processors; and
memory coupled to the one or more processors and storing instructions which, when executed by the one or more processors, cause the one or more processors to perform operations comprising:
  presenting a virtual game environment on a display of a gaming device, the virtual game environment comprising an advertisement placement location on a virtual medium, the advertisement placement location having a definition specifying an optical property of the virtual medium selected from a group comprising transparency, reflectivity, and smoothness of a material imitated by the virtual medium;
  sending the definition specifying the optical property of the virtual medium to an advertisement server;
  receiving an advertisement data file from the advertisement server, the advertisement data file comprising an advertisement image and one or more advertising criteria specifying a corresponding optical property of the advertisement image according to the specified optical property of the virtual medium; and
  applying the advertisement image for presentation at the advertisement placement location during game execution in accordance with the one or more advertising criteria such that at least a portion of the virtual game environment is displayed at a location associated with the virtual medium based on the advertisement image and the one or more advertising criteria.

26. A system, comprising:
one or more processors; and
memory coupled to the one or more processors and storing instructions which, when executed by the one or more processors, cause the one or more processors to perform operations comprising:
  receiving from a gaming device a definition of an advertisement placement location on a virtual medium in a virtual game environment, the definition specifying an optical property of the virtual medium selected from a group comprising transparency, reflectivity, and smoothness of a material imitated by the virtual medium; and
  sending an advertisement data file to the gaming device, the advertisement data file comprising an advertisement image and one or more advertising criteria specifying a corresponding optical property of the advertisement image according to the specified optical property of the virtual medium, the one or more advertising criteria controlling presentation of the advertisement image at the advertisement placement location during game execution such that at least a portion of the virtual game environment is displayed at a location associated with the virtual medium based on the advertisement image and the one or more advertising criteria.

* * * * *